United States Patent [19]
Franklin

[11] 3,734,224
[45] May 22, 1973

[54] LOAD HANDLING VEHICLES

[76] Inventor: John Warrender Franklin, 14, Daintree Croft, Coventry, England

[22] Filed: Mar. 19, 1971

[21] Appl. No.: 126,066

[52] U.S. Cl. ................180/66 R, 60/19, 180/77 R
[51] Int. Cl. ............................................B60k 17/10
[58] Field of Search .................180/66 R, 44 F, 77 R, 180/70 R; 60/19

[56] References Cited

UNITED STATES PATENTS

| | | | |
|---|---|---|---|
| 3,250,340 | 5/1966 | Roberson | 180/44 F |
| 3,256,950 | 6/1966 | De Biasi | 180/44 F |

FOREIGN PATENTS OR APPLICATIONS

| | | | |
|---|---|---|---|
| 576,420 | 4/1946 | Great Britain | 180/66 R |

Primary Examiner—Leo Friaglia
Assistant Examiner—Milton L. Smith
Attorney—Merriam, Marshall, Shapiro & Klose

[57] ABSTRACT

In a vehicle, primarily a load handling vehicle such as a fork lift truck, having a prime mover and ground-engaging wheels driven through a variable ration hydraulic transmission, a transmission ratio control is linked with a power output control of the prime mover to provide automatically an increase of the power output of the prime mover when the transmission ratio is varied to accelerate the vehicle. The transmission ratio control is operatively connected with a foot-operated rocker and the latter is linked with the power output control in a manner which provides an adjustable degree of lost motion so that the transmission ratio control is actuated before the power output control.

7 Claims, 3 Drawing Figures

LOAD HANDLING VEHICLES

SUMMARY OF THE INVENTION

This invention is concerned with vehicles of the type which are driven by a prime mover through a variable ratio hydraulic transmission, and is applicable with especial advantage to such vehicles which are load handling vehicles and in normal use are driven intermittently over short distances.

Load handling vehicles of the type referred to are stationary, or are driven very slowly, for a considerable proportion of a period of use, but brief periods of driving at normal speed are interspersed between brief periods when the vehicle is stationary or moving slowly. Accordingly, in cases where the prime mover is an internal combustion engine, the latter is provided with a governor which maintains the speed of the engine approximately constant at a value such that sufficient power is available for acceleration of the loaded vehicle to the normal driving speed. Maintenance of such an engine speed during the brief but frequent periods when the vehicle is stationary or is driven slowly, contributes considerably to wear of the engine and to fuel consumption.

It is an object of the invention to provide a vehicle of the type referred to having an internal combustion engine wherein the rate of wear of the engine and transmission and fuel consumption are reduced as compared with known vehicles.

According to the invention we provide a vehicle of the type referred to wherein the prime mover is provided with power output control means for varying the power output of the prime mover, and there is further provided a linkage between the power output control means and a transmission control means, whereby the power output of the prime mover is automatically varied when the transmission control means is operated to vary the transmission ratio.

With this arrangement the prime mover can be arranged to operate slowly or at a low power output whilst the vehicle is required to be stationary, or is required to be driven slowly, and the power output of the prime mover will automatically be increased when it is required to accelerate the vehicle to the normal driving speed.

In a case where the prime mover is an electric motor, the power output control means may comprise a rheostat for controlling the magnitude of the electrical current fed to the motor.

DETAILED DESCRIPTION

Figure 1:
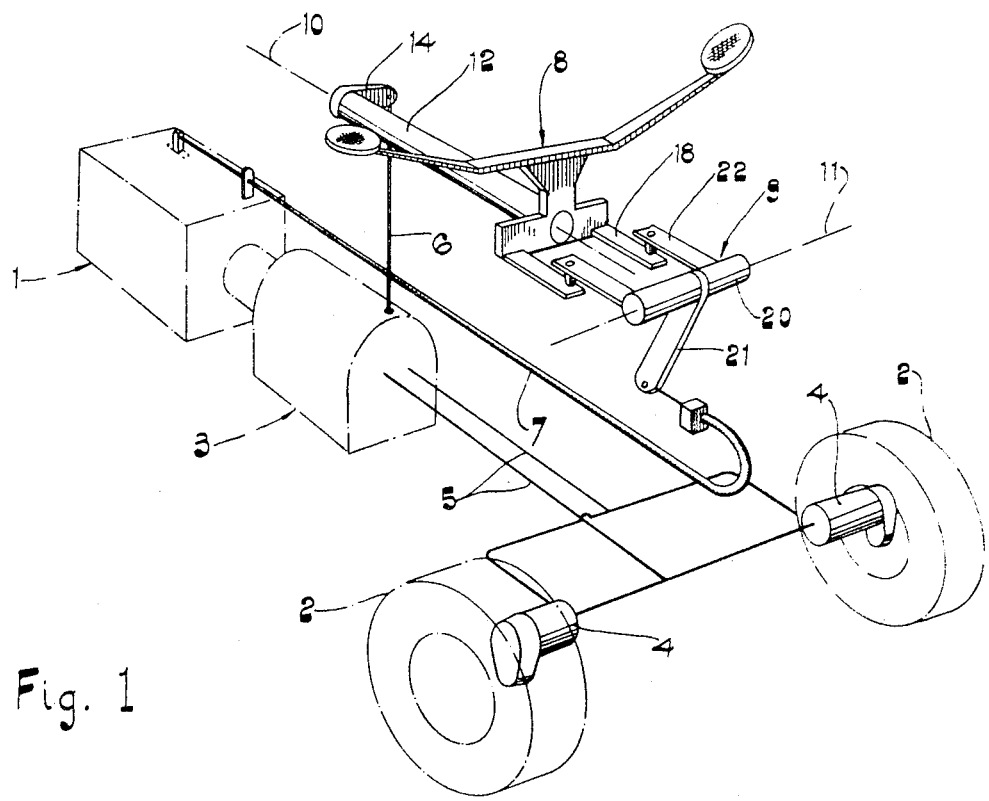
FIG. 1 is a schematic representation of certain parts of a vehicle according to the invention.

The vehicle illustrated in the accompanying drawings is a load handling vehicle such as a fork lift truck. The vehicle includes a prime mover 1 which typically is an internal combustion engine, although an electric motor could be provided. The vehicle further includes a plurality of ground or track-engaging wheels, of which only two are shown in FIG. 1, these being driving wheels 2. The number of driving wheels may be varied as required and in two convenient alternatives arrangements there is provided a single driving wheel, and four driving wheels respectively. Suitable arrangements are provided for steering at least some of the wheels and these steered wheels may be driving wheels or may be non-driving wheels.

The prime mover and the ground or track-engaging wheels may be mounted on a chassis of the vehicle. Alternatively, the vehicle may be of chassisless construction, in which an assembly including front ground or track-engaging wheels is mounted on one end of the prime mover and a further assembly including rear track or ground-engaging wheels is mounted on the opposite end of the prime mover.

For transmitting drive from the prime mover 1 to the driving wheels 2 there is provided a variable ratio hydraulic transmission means which is illustrated in FIG. 1. The transmission means includes a variable capacity swash plate pump 3 which is of known construction and which is drivingly connected with the prime mover 1, and a pair of fixed capacity reversible hydraulic motors 4, also of known construction, each of which is operatively associated with a respective one of the driving wheels 2. Ducts 5 are provided for conveying hydraulic fluid under pressure from the pump 3 to the motors and for conveying return fluid from the motors to the pump. The pump 3 includes an hydraulic reservoir and auxiliary pump means for maintaining a predetermined pressure of hydraulic fluid in the ducts 5 whilst the prime mover is operating, and thereby preventing cavitation in the hydraulic circuit.

The pump 3 further includes transmission control means for varying the capacity of the pump and thus varying the effective ratio of the transmission means. The transmission control means includes an operating rod 6 which extends upwardly from the pump and is movable lengthwise to vary the capacity of the pump. The rod 6 is movable in two directions from a datum position in which the capacity of the pump is zero and hydraulic fluid is prevented from flowing through the pump. When the operating rod is moved progressively upwardly from the datum position, hydraulic fluid is fed in one direction along the ducts 5 to the motors 4 at a progressively increasing rate, and when the operating rod is moved downwardly from the datum position hydraulic fluid is fed in the opposite direction through the ducts 5 to the motors at a progressively increasing rate. Thus, the motors 4 and the driving wheels can be caused to rotate in a forward direction or in a reverse direction according to the position of the operating rod 6.

The prime mover 1 is provided with a power output control means which in the case of an internal combustion engine is conveniently a throttle for controlling the rate at which fuel and air pass into the combustion chambers of the engine. The power output control means is operatively connected with a control cable 7 which in turn is connected through a linkage shown in FIGS. 2 and 3 with the operating rod 6. This linkage is arranged to provide automatically for movement of the control cable 7 in a direction corresponding to increasing power output of the prime mover in response to movement of the operating rod 6 in either direction from its datum position.

Figure 2:
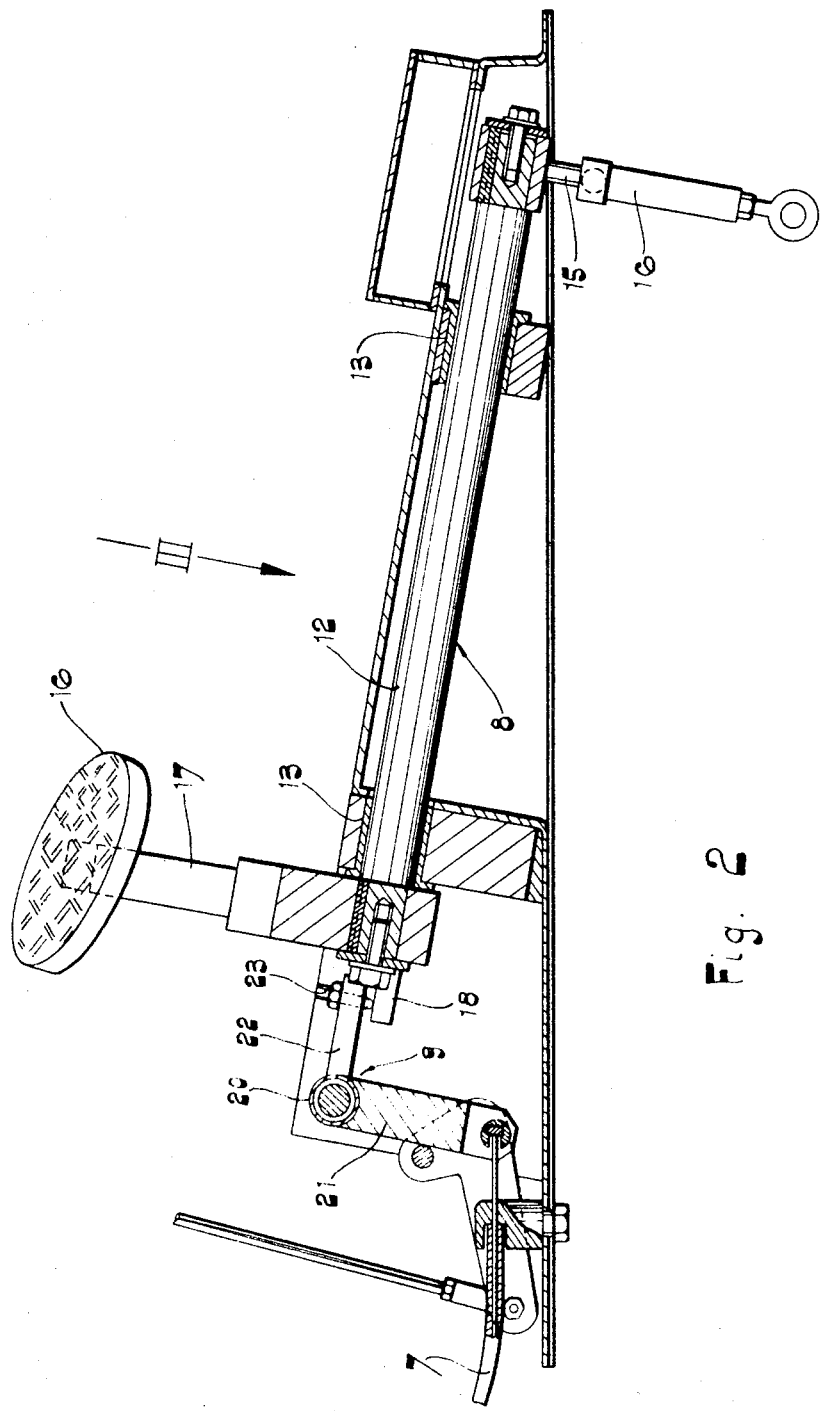
FIG. 2 is a view in side elevation and partly in cross-section on the longitudinal center line of the vehicle of certain parts of the vehicle illustrated in FIG. 1 and showing a linkage between the transmission control means and the power output control means.
Figure 3:
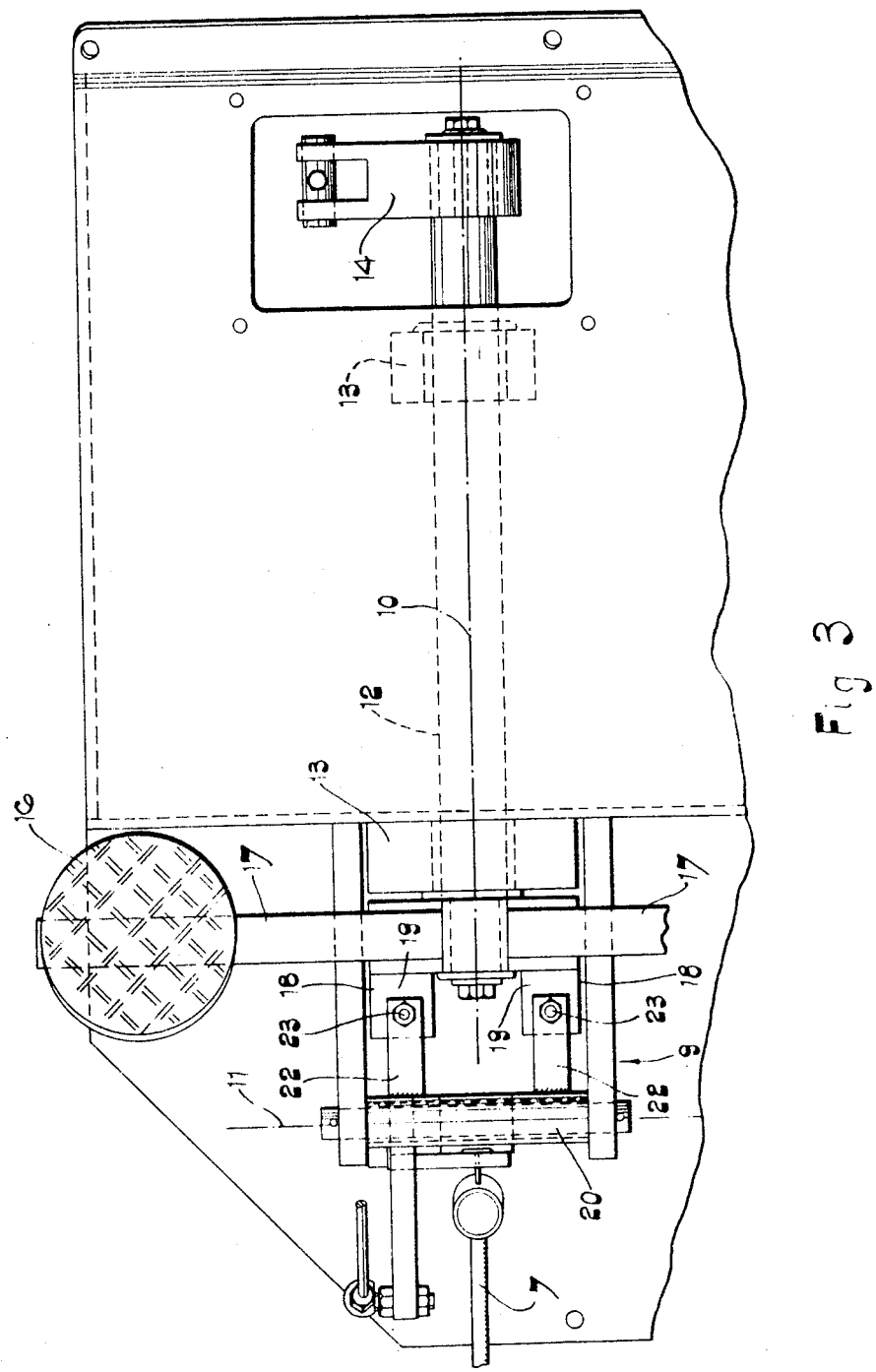
FIG. 3 is a view on the arrow III of the parts shown in FIG. 2.

The linkage shown in FIGS. 2 and 3 comprises a rocker 8 connected with the operating rod 6, and a lever 9 connected with the control cable 7. The rocker is arranged for movement about a rocker axis 10 which extends in a direction fore and aft of the vehicle, and the lever is mounted for movement about a lever axis 11 which is transverse to the rocker axis and which extends laterally of the vehicle.

The rocker 8 includes a shaft 12 which extends along the rocker axis 10 and which is mounted in suitable bearings 13 adjacent its forward and rearward ends for rocking movement about that axis. An arm 14 is mounted on the shaft at the rearward end thereof, the arm extending radially of the shaft towards one side of the vehicle, and being keyed to the shaft so that when the latter is rocked in either direction from the datum position shown in the drawings, the radially outer end of the arm moves along an arcuate path in a vertical plane. The radially outer end of the arm 14 is directly above the operating rod 6 of the hydraulic pump and is connected with this rod by a connecting member 15 pivotally connected at one of its ends to the radially outer end of the arm and at the other of its ends to the rod 6.

Foot pedal means is mounted on the rocker, such means comprising a pair of foot pedals 16 which afford respective tread portions for engagement by the foot of an operator on opposite sides of the rocker axis 10. The foot pedals are mounted on respective supporting arms 17 which extend laterally and slightly upwardly from the shaft 12 on opposite sides thereof. The inner ends of the supporting arms are welded to the shaft 12 at the forward end thereof, and the foot pedals are welded to the outer ends of these arms.

The rocker 8 further includes a pair of plates 18 which are also welded to the forward end of the shaft 12 on opposite sides thereof and which project forwardly from the shaft towards the lever 9. The upwardly presented surfaces 19 of these plates constitute abutment surfaces for engagement by co-operating parts of the lever 9. It will be noted that these abutment surfaces face in a direction transverse of both rocker axis 10 and the lever axis and that the abutment surfaces are off-set from the rocker axis on opposite sides thereof.

The lever 9 includes a bar 20 which extends along the lever axis 11 and is mounted in suitable bearing means for pivoting movement about that axis. One end of an arm 21 is welded to a mid-portion of the bar 20 and the arm extends downwardly from the bar and radially of the lever axis. One end of the control cable 7 is attached to the lower end of the arm 21 so that rocking movement of the lever 9 will produce longitudinal movement of the cable. The arrangement is such that movement of the lower end of the arm 21 rearwardly of the vehicle will increase the power output of the prime mover when the latter is operating.

The lever 9 further includes a pair of plates 22 which are welded to the bar 20 adjacent the ends thereof and which extend rearwardly from the bar to positions above the plates 12. The rearward end of each of the plates 22 is formed with an aperture through which an adjustment means in the form of a bolt 23 extends towards the associated plates 18. Nuts 24 are provided for clamping each of the adjustment bolts in a selected position of adjustment on its associated plate 22.

Generally, the adjustments bolts 23 are so positioned that when the rocker 8 is in the datum position, each of the bolts is separated by a predetermined clearance gap from the associated one of the plates 18. This arrangement provides some lost motion in the linkage which extends between the operating rod 6 and the control cable 7. The extent of this lost motion can be varied by suitable adjustment of the bolts 23 and if required the bolts may be positioned to contact the plates 18 when the rocker is in the datum position, so avoiding lost motion in the linkage. It will be noted that the adjustment bolts permit of individual adjustment of the clearance gap between one of the abutment surfaces 19 and its associated bolt 23 relative to the clearance gap between the other of the abutment surfaces 19 and the bolt associated therewith.

If required the adjustment bolts 23 may be carried on the plates 18 which form part of the rocker, instead of being carried on the plates 22 which form part of the lever.

It will be apparent that the lost motion may be provided by other means, for example a pin operating in an elongate slot at an appropriate position in the linkage.

It will be noted that the positions on the lever 9 at which contact is established with the rocker 8, namely the ends of the adjustment bolts 23, are off-set from the lever axis 11 and on the same side thereof, namely the rearward side.

Springs 24 are provided for biasing the rocker 8 to the datum position in which the foot pedals 16 lie at the same level and the arm 14 extends horizontally from the shaft 12.

Operation of the transmission control means and power output control means will now be described.

Whilst the rocker 8 remains in the datum position, hydraulic fluid is prevented from passing through the pump 3 and accordingly rotation of the driving wheels is prevented. When it is required to drive the vehicle in a forward direction one of the foot pedals 16 is depressed so moving the rocker from the datum position in a first direction and causing the pump to deliver hydraulic fluid along the ducts 5 to drive the motors 4 in a forward direction. A small depression of the foot pedal will not produce movement of the lever 9 owing to the lost motion which results from the clearance gap, and the motors will be driven at a slow speed. Further depression of the foot pedal will increase the output of the pump 3 thus driving the motors at a higher speed. Concurrently, one of the plates 18 will engage with the associated one of the adjustment bolts 23 so moving the lever 9 about the lever axis 11 in an anti-clockwise direction as viewed in FIG. 2. Such movement of the lever will operate the power output control means through the control cable 7 so as to increase the power output of the prime mover.

If it is required to drive the vehicle in a reverse direction, the other of the foot pedals 16 is depressed. Again, a small depression of the foot pedal does not produce movement of the lever 9 but does cause hydraulic fluid to be supplied in the reverse direction to the motors 4 to drive these at a slow speed. Further depression of the said other foot pedal produces movement of the lever 9, again in an anti-clockwise direction as seen in FIG. 2, thus increasing the power output of the prime mover concurrently with adjustment of the pump 3 to drive the motors at a higher speed. If the operator removes his feet from the pedals 16 the springs 24 will return the rocker to the datum position and the vehicle will be brought to rest.

The prime mover can be arranged to run at a slow speed, commonly referred to as tick-over speed, whilst the vehicle is required to be stationary, or to be driven at a slow speed, and the speed of the prime mover can automatically be increased by means of the power output control means when a greater power output is required from the prime mover, for example to accelerate the vehicle to a higher speed, or to drive the vehicle at such higher speed. Unnecessary wear of the engine and transmission is therefore avoided.

I claim:
1. In a vehicle having:
    a. a prime mover,
    b. a plurality of ground-engaging wheels, at least one of which is a driving wheel,
    c. a variable ratio hydraulic transmission means for transmitting drive from the prime mover to the driving wheel, and
    d. transmission control means for varying the transmission ratio, the improvement therein comprising:
    e. power output control means for varying the power output of the prime mover,
    f. the transmission control means is arranged for controlling the direction of rotation of the driving wheel,
    g. the transmission control means is movable from a datum position in either of two different directions corresponding respectively to forward and reverse rotation of the driving wheel,
    h. a linkage operatively connected between the power output control means and the transmission control means, whereby the power output of the prime mover is automatically varied when the transmission control means is operated to vary the transmission ratio,
    i. said linkage is arranged for operating the power output control means in such a manner as to increase the power output of the prime mover in response to movement of the transmission control means in either direction from the datum position.
    j. said linkage including:
        1. a rocker mounted for movement about a rocking axis in either direction from a datum position and connected with the transmission control means for movement coordinated with that of the latter, and
        2. a lever mounted for movement about a lever axis transverse of the rocking axis, and connected with the power output control means,
    k. the rocker presents abutment surfaces at positions off-set from said rocker axis on opposite sides thereof facing in substantially the same direction transverse of both the rocker axis and the lever axis for engagement with said lever at respective contact positions on the lever, and
    l. said contact positions on the lever are off-set from the lever axis on the same side thereof whereby movement of the rocker in either direction from the datum position increases the power output of the prime mover when operating.

2. The improvement according to claim 1 wherein said linkage includes lost motion means interposed operatively between the rocker and the power output control means, whereby when the rocker is moved from the datum position, the transmission control means is operated to vary the transmission ratio before the power output control means is operated to increase the power output.

3. The improvement according to claim 2 wherein said lost motion means includes adjustment means on one of the lever and the rocker for adjusting a clearance gap between said abutment surfaces of the rocker and said lever at the contact positions.

4. The improvement according to claim 3 wherein the adjustment means is arranged for providing individual adjustment of the clearance gap at one of said abutment surfaces relative to the clearance gap at the other of said abutment surfaces.

5. The improvement according to claim 1 wherein foot pedal means is mounted on said rocker, the foot pedal means including tread portions disposed on opposite sides of the rocker axis.

6. The improvement according to claim 1 further comprising:
    a. an arm mounted on the rocker and extending radially of the rocker axis, and
    b. a connecting member, one end of which is pivotally connected with said arm at a position remote from the rocker axis, and the other end of which is connected with said transmission control means.

7. In a vehicle having:
    a. a prime mover,
    b. a plurality of ground-engaging wheels, at least one of which is a driving wheel,
    c. a variable ratio hydraulic transmission means for transmitting drive from the prime mover to the driving wheel, and
    d. transmission control means for varying the transmission ratio,
    the improvement wherein there is provided:
    e. power output control means for varying the power output of the prime mover,
    f. a linkage operatively connected between the power output control means and the transmission control means, whereby the power output of the prime mover is automatically varied when the transmission control means is operated to vary the transmission ratio,
    g. said linkage including:
        1. a rocker mounted for movement about a rocking axis in either direction from a datum position and connected with the transmission control means for movement coordinated with that of the latter, and
        2. a lever mounted for movement about a lever axis transverse of the rocking axis, and connected with the power output control means,
    h. the rocker presents abutment surfaces at positions off-set from said rocker axis on opposite sides thereof facing in substantially the same direction transverse of both the rocker axis and the lever axis for engagement with said lever at respective contact positions on the lever, and
    i. said contact positions on the lever are off-set from the lever axis on the same side thereof whereby movement of the rocker in either direction from the datum position increases the power output of the prime mover when operating.

* * * * *